US008532573B2

(12) United States Patent
Harada et al.

(10) Patent No.: US 8,532,573 B2
(45) Date of Patent: Sep. 10, 2013

(54) INFORMATION TERMINAL DEVICE AND METHOD OF CONTROLLING THE SAME

(75) Inventors: Noriyuki Harada, Kawasaki (JP); Hiroshi Kanno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 698 days.

(21) Appl. No.: 11/501,820

(22) Filed: Aug. 10, 2006

(65) Prior Publication Data

US 2007/0232335 A1  Oct. 4, 2007

(30) Foreign Application Priority Data

Mar. 28, 2006 (JP) ................................. 2006-088853

(51) Int. Cl.
*H04B 7/00* (2006.01)
(52) U.S. Cl.
USPC ....... 455/41.2; 455/567; 455/41.3; 455/569.1
(58) Field of Classification Search
USPC ................. 455/550, 567, 417, 418, 410, 517, 455/41.2, 466, 556.1, 41.1, 41.3, 68, 67.11, 455/69, 445, 450
See application file for complete search history.

(56) References Cited

U.S. PATENT DOCUMENTS

| 6,714,233 | B2* | 3/2004 | Chihara et al. | 348/14.02 |
|---|---|---|---|---|
| 6,978,148 | B2* | 12/2005 | Adachi et al. | 455/517 |
| 7,324,806 | B2* | 1/2008 | Tomita | 455/411 |
| 7,366,901 | B2* | 4/2008 | Hapamas et al. | 713/168 |
| 2002/0002036 | A1* | 1/2002 | Uehara et al. | 455/41 |
| 2002/0068600 | A1* | 6/2002 | Chihara et al. | 455/550 |
| 2002/0115478 | A1* | 8/2002 | Fujisawa et al. | 455/567 |
| 2002/0137552 | A1* | 9/2002 | Cannon et al. | 455/567 |
| 2004/0063459 | A1* | 4/2004 | Yamashita et al. | 455/556.1 |
| 2004/0072558 | A1* | 4/2004 | Van Bosch | 455/417 |
| 2004/0185855 | A1* | 9/2004 | Storm et al. | 455/445 |
| 2005/0070336 | A1* | 3/2005 | Tamura | 455/567 |
| 2005/0208932 | A1* | 9/2005 | Tamura et al. | 455/418 |
| 2005/0277403 | A1* | 12/2005 | Schmidt et al. | 455/410 |
| 2006/0019609 | A1* | 1/2006 | Finley et al. | 455/68 |
| 2006/0128307 | A1* | 6/2006 | Levien et al. | 455/41.2 |

FOREIGN PATENT DOCUMENTS

| JP | 2000-295321 | 10/2000 |
|---|---|---|
| JP | 2002-223475 | 8/2002 |
| JP | 2002-291044 | 10/2002 |
| JP | 2002-330473 | 11/2002 |
| JP | 2003-087864 | 3/2003 |
| JP | 2005-110051 | 4/2005 |
| JP | 2005-192041 | 7/2005 |

OTHER PUBLICATIONS

Notice of Rejection mailed Aug. 3, 2010, in corresponding Japanese Application No. 2006-088853.

* cited by examiner

*Primary Examiner* — Edward Urban
*Assistant Examiner* — Golam Sorowar
(74) *Attorney, Agent, or Firm* — Staas & Halsey LLP

(57) ABSTRACT

An information terminal device is disclosed that performs communication via a communication network. The information terminal device includes a short-range wireless communication unit that performs short-range wireless communication with an electronic device, a storing unit that stores information about communication via the communication network while the short-range wireless communication with the electronic device is disconnected, and a control unit that causes, upon restoration of the short-range wireless communication with the electronic device, the short-range wireless communication unit to transmit to the electronic device the information about the communication via the communication network if the information about the communication via the communication network is stored in the storing unit.

17 Claims, 6 Drawing Sheets

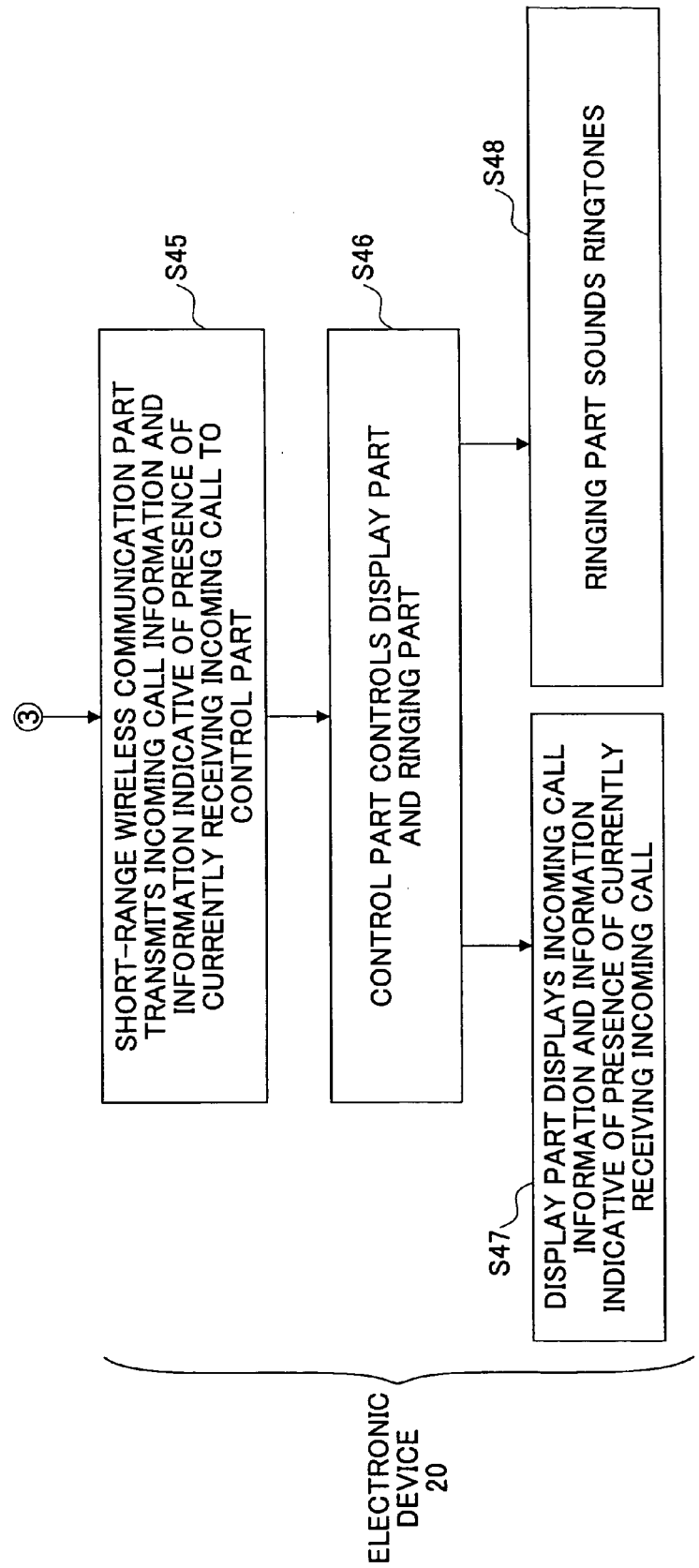

INFORMATION TERMINAL DEVICE AND METHOD OF CONTROLLING THE SAME

BACKGROUND OF THE INVENTION

1. Field of the Invention

The present invention generally relates to an information terminal device and a method of controlling the same, and particularly relates to an information terminal device connectable to an electronic device using short-range wireless communication and a method of controlling the same.

2. Description of the Related Art

There have been disclosed techniques for enhancing user convenience by connecting information terminal devices such as mobile phones to electronic devices using short-range wireless communication.

Patent Document 1 discloses a technique that connects, for example, a mobile phone to a wristwatch using short-range wireless communication based on the well-known Bluetooth short-range wireless communication standards and activates a vibration actuator provided in the wristwatch when the mobile phone receives an incoming call so as to notify a user of the incoming call.

Patent Document 2 discloses a technique that connects, for example, a mobile phone to a wristwatch type electronic device using short-range wireless communication based on the Bluetooth standards so as to notify a user of an incoming call through the electronic device and send a voice message from the electronic device to the mobile phone according to an instruction from the user.

Patent Document 3 discloses a technique that connects a mobile communication terminal to an electronic device using short-range wireless communication and transmits audio data, mail data, or incoming call history from the mobile communication terminal to the electronic device so as to allow a user to see such information on the electronic device.

These techniques that connect a mobile phone or the like to an electronic device using short-range wireless communication and transmit to the electronic device information about incoming calls such that a user can know whether there is an incoming call and know the name and telephone number of the caller of the incoming call if any without picking up the mobile phone may be convenient for the user.

However, if short-range wireless communication is disabled for some reason, information necessary for the user is not transmitted from the mobile phone or the like, which may be inconvenient for the user.

<Patent Document 1> Japanese Patent Laid-Open Publication No. 2003-87864

<Patent Document 2> Japanese Patent Laid-Open Publication No. 2002-330473

<Patent Document 3> Japanese Patent Laid-Open Publication No. 2005-192041

<Patent Document 4> Japanese Patent Laid-Open Publication No. 2000-295321

<Patent Document 2> Japanese Patent Laid-Open Publication No. 2002-223475

SUMMARY OF THE INVENTION

In view of the forgoing, the present invention is directed to a configuration in which, even if short-range wireless communication between an information terminal device having a function for communication via a communication network and an electronic device connected to the information terminal device using the short-range wireless communication is disabled, the electronic device can obtain information about communication performed via the communication network while the short-range wireless communication is disabled.

In one embodiment of the present invention, when short-range wireless communication with an electronic device is disconnected, information about communication via a communication network is stored. Then, if the information about communication via a network is stored, the information about communication via a communication network is transmitted to the electronic device upon restoration of the short-range wireless communication with the electronic device.

Accordingly, even if short-range wireless communication between an information terminal device and the electronic device is disconnected for some reason, information about communication via the communication network performed during the disconnection is stored such that the stored information is transmitted to the electronic device upon restoration of the short-range wireless communication. Thus a user can obtain the information acquired by the information terminal device via the network communication including information acquired while the short-range wireless communication is disabled.

As described above, according to an aspect of the present invention, it is possible to obtain the information acquired by an information terminal device via a network communication including information acquired while the short-range wireless communication is disabled. Therefore, a user can obtain all the information without paying any attention to the state of the short-range wireless communication, which may be very convenient for the user.

BRIEF DESCRIPTION OF THE DRAWINGS

FIGS. 4-6 illustrate a flowchart for explaining operations of a mobile phone according to a second embodiment of the present invention.

DETAILED DESCRIPTION OF THE PREFERRED EMBODIMENT

Figure 1:
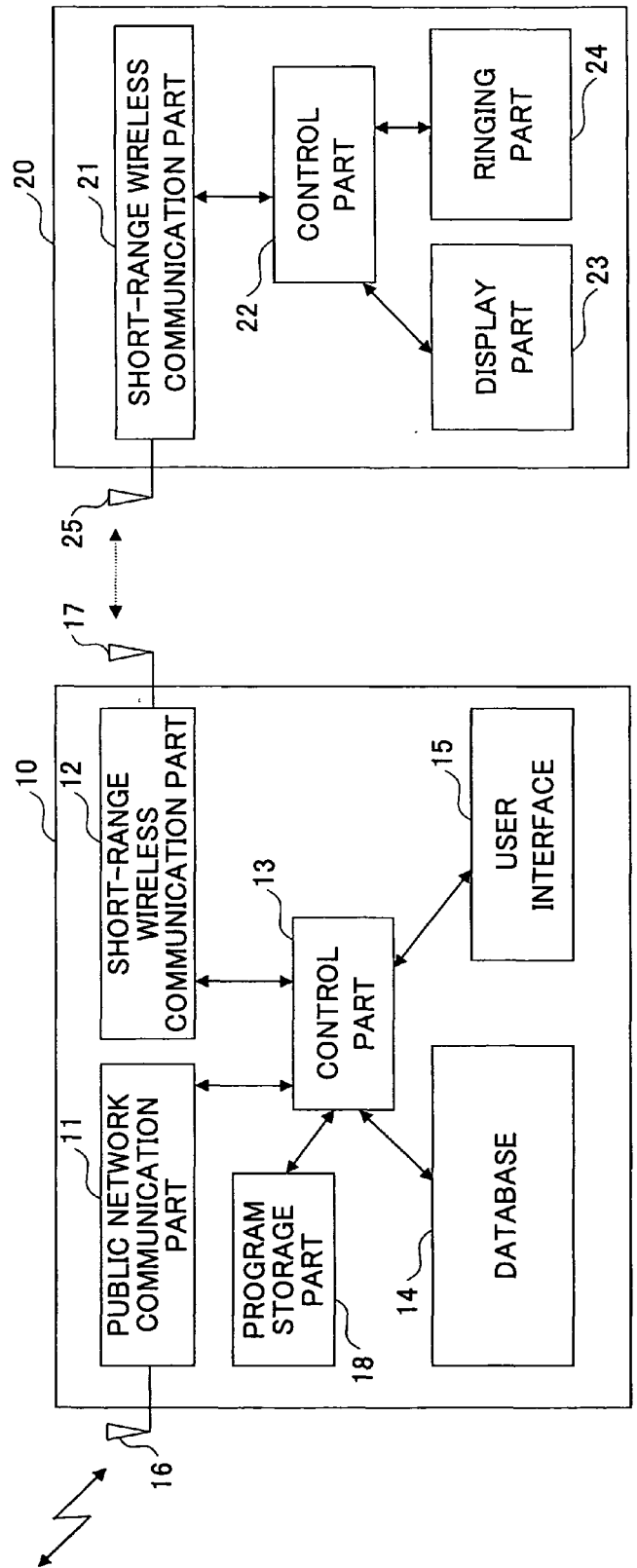
FIG. 1 is a block diagram showing a configuration of a mobile phone according to an embodiment of the present invention.

The following describes preferred embodiments of the present invention.

As described above, in an environment where a mobile phone and an electronic device is connected using short-range wireless communication based on well-known short-range wireless communication standards such as the Bluetooth, information about incoming calls to the mobiles phone such as the telephone numbers and names of the callers can be transmitted to the electronic device so as to allow a user to display the information on a screen of the electronic device without actually picking up the mobile phone.

However, if the short-range wireless communication is disconnected for some reason, the user cannot obtain information and history of the incoming calls received by the mobile phone during the disconnection (hereinafter also collectively referred to as "incoming call information"), which may be inconvenient for the user.

In one embodiment of the present invention, when disconnected short-range wireless communication is restored, incoming call information, such as caller telephone numbers, caller names if registered in a telephone book, and the time of receiving incoming calls, stored by a mobile phone during the disconnection is automatically transmitted to an electronic device using short-range wireless communication. Accordingly, the incoming call information about the incoming calls received by the mobile phone during the disconnection of the short-range wireless communication can be displayed on the electronic device, which improves user convenience.

In another embodiment of the present invention, if disconnected short-range wireless communication is restored while a mobile phone is receiving an incoming call, the mobile phone automatically transmits information indicative of the presence of the currently receiving incoming call, the telephone number of the caller, the name of the caller (if registered in a telephone book), and the time of receiving the incoming call. Accordingly, if disconnected short-range wireless communication is restored while receiving an incoming call, information indicating whether an incoming call is received by the mobile phone during the disconnection of the short-range wireless communication, the telephone number and name (if registered in a telephone book) of the caller, and the time of receiving the call if any can be displayed on the electronic device, which improves user convenience.

For example, in an environment where a mobile phone and an electronic device is connected using short-range wireless communication, the short-range wireless communication might be disconnected depending on a situation that a user carries the mobile phone and a type of the electronic device (e.g. a wristwatch type electronic device). If the mobile phone receives an incoming call during the disconnection but the information indicative of receipt of the incoming call is not transmitted to the electronic device, the user cannot know the receipt of the incoming call, which may be inconvenient for the user.

According to the above-described embodiment of the present invention, when the short-range wireless communication is restored, incoming call history during the disconnection of the short-range wireless communication such as, e.g., the telephone number of the caller, the name of the caller (if registered in a telephone book), and the time of receiving the incoming call is automatically transmitted to the electronic device. Accordingly, upon restoration, the user can see information such as the incoming call history during the disconnection of the short-range wireless communication on the electronic device without actually picking up the mobile phone, which may be convenient for the user.

As another example, if short-range wireless communication between a mobile phone and an electronic device is temporarily disconnected, incoming call history of incoming telephone calls received during the temporary disconnection is transmitted to the electronic device. That is, as the incoming call history of the incoming calls to the mobile phone including incoming calls received during the disconnection of the short-range wireless communication is transmitted to the electronic device, a user does not need to always pay attention to the state of the short-range wireless communication.

If the electronic device connected to the mobile phone using short-range wireless communication is of a user-wearable type such as a wristwatch type electronic device, the user might be moved outside an area where radio waves do not reach. Even in such a case, according to the above-described embodiment of the present invention, when the user moves back within an area where radio waves reach and the short-range wireless communication is restored, incoming call history of all the incoming calls received by the mobile phone during then is transmitted to the electronic device. This may be very convenient for the user.

In a further embodiment of the present invention, if disconnected short-range wireless communication is temporarily restored while a mobile phone is receiving an incoming call, information indicating the presence of the currently receiving incoming call is automatically transmitted from the mobile phone to the electronic device using the short-range wireless communication. The caller telephone number, the caller name if registered in a telephone book, the time of receiving the incoming call, etc., can also be transmitted. Accordingly, if disconnected short-range wireless communication is restored while a mobile phone is receiving an incoming call, a user can see the telephone number of the caller, the name of the caller, and the time of receiving the incoming call on a screen of an electronic device. The user can also be notified of the incoming call by vibration or ringtones of the electronic device. These configurations may be very convenient for the user.

With these configurations, for example, if an incoming call that has reached a mobile phone during a temporary disconnection of wireless communication between the mobile phone and an electronic device is still being received upon restoration of the short-range wireless communication, information indicating the presence of currently receiving incoming call is automatically transmitted to the electronic device using the short-range wireless communication. Not only in the case where short-wireless communication is enabled when receiving an incoming call, but also in the case short-range wireless communication is temporarily enabled while receiving an incoming call as in this example, information indicating the incoming call and the information about the caller are automatically transmitted to an electronic device. Thus a user can timely know the presence of the incoming call even in a condition where short-range wireless communication is not continuously available due to poor reception of radio waves. Accordingly, the user can take appropriate action such as moving to a place where short-range wireless communication is stably available to answer the incoming call, which may be very convenient for the user.

FIG. 1 is a block diagram for explaining functions of a mobile phone 10 and a wristwatch type electronic device 20 as an electronic device connected to the mobile phone 10 using short-range wireless communication based on well-known standards such as the Bluetooth according to an embodiment of the present invention.

With reference to FIG. 1, the mobile phone 10 of this embodiment of the invention includes a short-range wireless communication part 12 for short-range wireless communication with the wristwatch type electronic device 20, and a control part 13 having a function for receiving incoming telephone calls via an antenna 16 using a public network communication part 11 and automatically transmitting information about the incoming calls to the wristwatch type electronic device 20 using the short-range wireless communication. Accordingly, when the mobile phone 10 receives an incoming call, a user can know the fact of receiving the incoming call and incoming call information thereof without picking up the mobile phone 10.

The mobile phone 10 further includes a database 14 for storing incoming call information about incoming calls received by the mobile phone 10 while the short-range wireless communication by the short-range wireless communication part 12 is disconnected for some reason. The control part 13 automatically executes, when the short-range wireless communication is restored, an operation of transmitting to the wristwatch type electronic device 20 the incoming call information about incoming calls received during the disconnection.

In the case where an incoming call that has reached the mobile phone 10 during a temporary disconnection between the mobile phone 10 and the electronic device 20 is still being received upon restoration of the short-range wireless communication, the control part 13 preferably also automatically executes, when the short-range wireless communication is restored, an operation of transmitting to the wristwatch type electronic device 20 information indicative of the presence of the currently receiving incoming call and incoming call information about the incoming call such as the telephone number of the caller of the incoming call, the name of the caller (if registered in a telephone book), the time of receiving the incoming call, etc. This configuration is described below as a second embodiment of the present invention.

The mobile phone 10 further includes the public network communication part 11. The public network communication part 11 provides connection to a public communication network via the antenna 16 and has a function for transmitting outgoing calls from and receiving incoming calls to the mobile phone 10.

The short-range wireless communication part 12 provides, in combination with a short-range wireless communication part 21 of a wristwatch type electronic device 20, a connection between the mobile phone 10 and the wristwatch type electronic device 20 using the short-range wireless communication via an antenna 17 of the mobile phone 10 and an antenna 25 of the wristwatch type electronic device 20.

When an incoming telephone call is received, the control part 13 executes an operation for transmitting information about the incoming call to the wristwatch type electronic device 20 using the short-range wireless communication. In the case where disconnection of the short-range wireless communication is detected by the short-range wireless communication part 12, the control part 13 stores incoming call information in the database 14. Then, when the short-range wireless communication is restored, the control part 13 executes an operation for transmitting history of incoming calls received during the disconnection, information indicating the presence of a currently receiving incoming call (in the case of the second embodiment), etc., to the wristwatch type electronic device 20 via the short-range wireless communication part 12.

The database 14 stores the incoming call history of the mobile phone 10.

In the illustrated exemplary embodiment, the mobile phone 10 further includes a program storage part 18. The program storage part 18 is a portable recording medium such as a ROM or an SD card. A CPU in the control part 13 loads a control program stored in the program storage part 18 to a memory and sequentially executes instructions of the program, so that control operations of the mobile phone 10 described below with reference to FIGS. 2-6 are performed. A similar program storage part (not shown) may also be provided in the wristwatch type electronic device 20. A CPU in a control part 22 sequentially executes instructions of a program stored in the program storage part, so that operations of the wristwatch type electronic device 20 described below are performed.

The wristwatch type electronic device 20 includes the short-range wireless communication part 21, the control part 22, a display part 23, and a ringing part 24.

The short-range wireless communication part 21 provides a short-range wireless communication environment with the mobile phone 10. The control part 22 receives incoming call information of the mobile phone 10 from the short-range wireless communication part 21 and causes the display part 23 to display the incoming call information.

The display part 23 receives the incoming call information from the control part 22 and displays the incoming call information on its screen. When the control part 22 receives the incoming call information, the ringing part 24 is controlled by the control part 22 to perform a ringing operation (or a vibrating operation). For example, the "ringing operation (or the vibrating operation)" could include sounding ringtones and/ or causing vibration by a vibration actuator.

It is to be noted that the public network communication part 11 of the mobile phone 10 may have a known configuration that is applied in existing mobile phones and therefore is not described herein. The short-range wireless communication parts 12 and 21 of the mobile phone 10 and the wristwatch type electronic device 20 may employ technologies base on the known Bluetooth standards or the like and therefore are not described herein.

In the embodiments of the present invention, information that is stored in the database 14 by the control part 13 of the mobile phone 10 during disconnection of the short-range wireless communication by the short-range wireless communication part 12 and that is automatically transmitted to the wristwatch type electronic device 20 upon restoration of the short-range wireless communication is not limited to incoming telephone call information and may include other information received by the mobile phone 10 such as information about incoming Email.

Destination electronic devices to be connected to the mobile phone 10 using short-range wireless communication are not limited to the wristwatch type electronic device 20 or electronic devices with short-range wireless communication functions that are wearable by users such as wristwatches, and may include other various electronic devices with short-range wireless communication functions such as personal computers and television receivers.

The following provides detailed description of operations of the mobile phone 10 and the wristwatch type electronic device 20 having the above-described configurations with reference to FIGS. 2-6.

Figure 2:
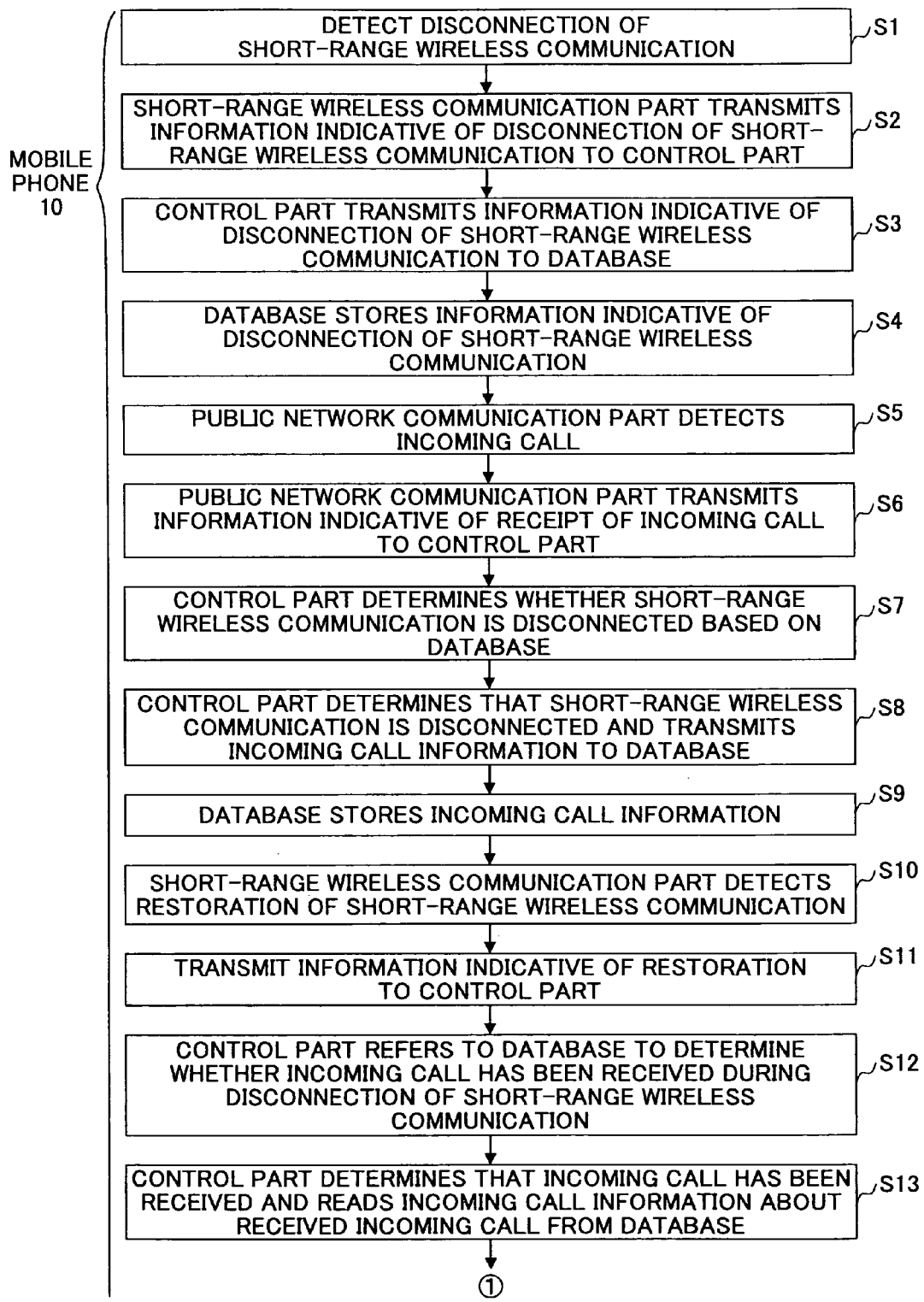
FIGS. 2-3 illustrate a flowchart for explaining operations of a mobile phone according to a first embodiment of the present invention.
Figure 3:
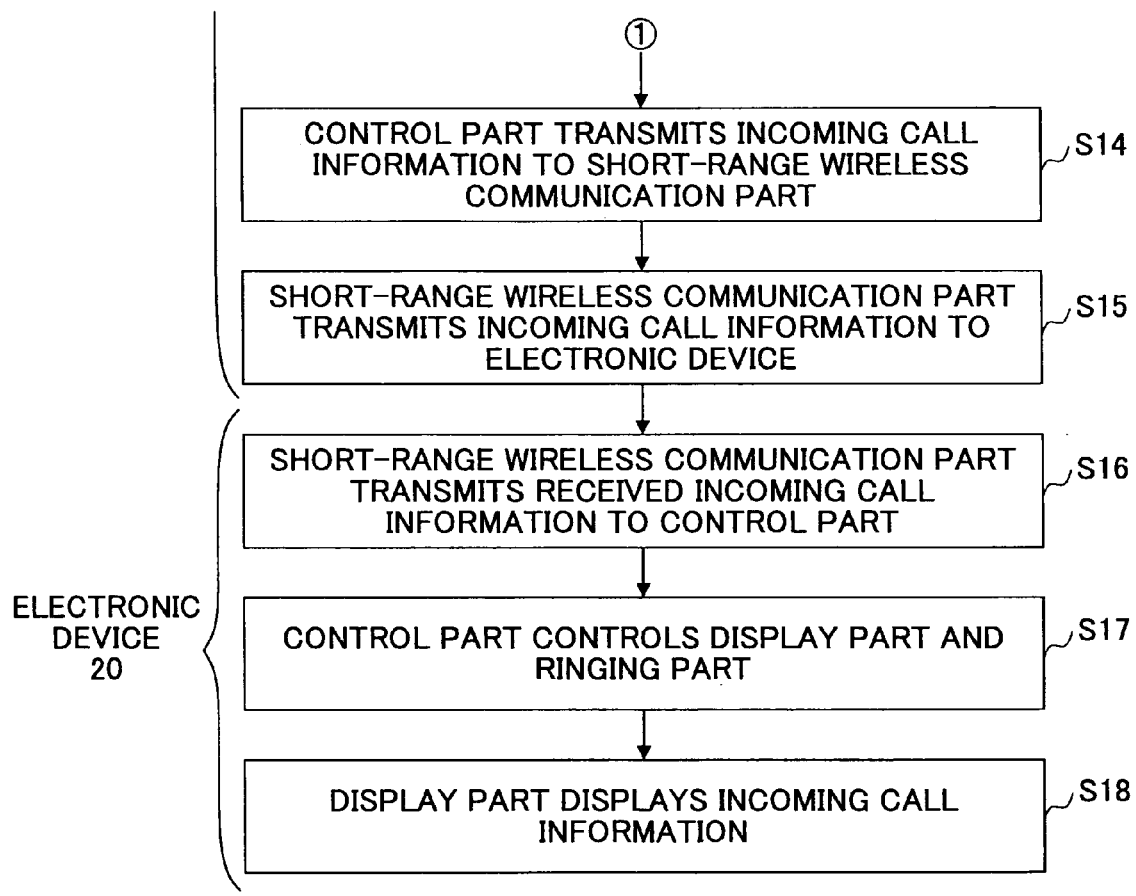

First, with reference to FIGS. 2 and 3, operations of the mobile phone 10 are described according to a first embodiment of the present invention.

If the short-range wireless communication part 12 detects disconnection of short-range wireless communication with the wristwatch type electronic device 20 (Step S1), the short-range wireless communication part 12 transmits information indicative of the disconnection to the control part 13 (Step S2). The control part 13 receives the information and transmits the received information to the database 14 (Step S3). The database 14 receives the information and stores the received information indicative of the disconnection of the short-range wireless communication (Step S4).

If there is an incoming call to the mobile phone 10 from the outside, the public network communication part 11 detects the incoming call (Step S5). The public network communication part 11 then transmits information indicative of receipt of the incoming call to the control part 13 (Step S6). The control part 13 receives the information and refers to the database 14 to determine whether the short-range wireless communication is disconnected (Step S7).

If the control part 13 determines that the short-range wireless communication is disconnected based on the information stored in the database 14, the control part 13 receives incoming call information from the public network communication part 11 and transmits the incoming call information to the database 14 (Step S8). The database 14 stores the received incoming call information (Step S9).

When the disconnected short-range wireless communication is restored, the short-range wireless communication part 12 detects the restoration (Step S10). The short-range wireless communication part 12 then transmits information indicative of the restoration to the control part 13 (Step S11). The control part 13 receives the information and refers to the database 14 to determine whether an incoming call has been received during the disconnection of the short-range wireless communication (Step S12).

If the control part 13 determines that an incoming call has been received during the disconnection of the short-range wireless communication based on the information stored in the database 14, the control part 13 reads incoming call information about the received incoming call from the data base 14 (Step S13). The control part 13 transmits the read incoming call information to the short-range wireless communication part 12 (Step S14). The short-range wireless communication part 12 transmits the received incoming call information to the wristwatch type electronic device 20 using the short-range wireless communication (Step S15).

When the wristwatch type electronic device 20 receives the incoming call information, the short-range wireless communication part 21 of the wristwatch type electronic device 20 transmits the incoming call information to the control part 22 (Step S16). When receiving the incoming call information, the control part 22 controls the display part 23 and the ringing part 24 (Step S17) so as to cause the display part 23 to display the incoming call information on its screen (Step S18) and the ringing part 24 to sound ringtones or vibrate the wristwatch type electronic device 20, thereby notifying a user of receipt of the incoming call information.

If plural incoming calls were received by the public network communication part 11 of the mobile phone 10 during disconnection of the short-range wireless communication, the following operations are performed. For example, if two incoming calls were received during disconnection of the short-range wireless communication, the operations of Step S5-S9 are performed for each of the incoming calls. Thus incoming call information about the incoming calls is stored in the database 14. When the short-range wireless communication is restored, the stored incoming call information is automatically read from the database 14 of the mobile phone 10 in the operations of Steps S12-S18, transmitted to the wristwatch type electronic device 20, and displayed thereon.

Accordingly, a user can determine whether one or more incoming calls have been received during disconnection of the short-range wireless communication and obtain incoming call information about the incoming calls, if any, without actually picking up the mobile phone 10. The user can take a necessary action such as contacting the caller of the incoming call based on the incoming call information.

Figure 4:
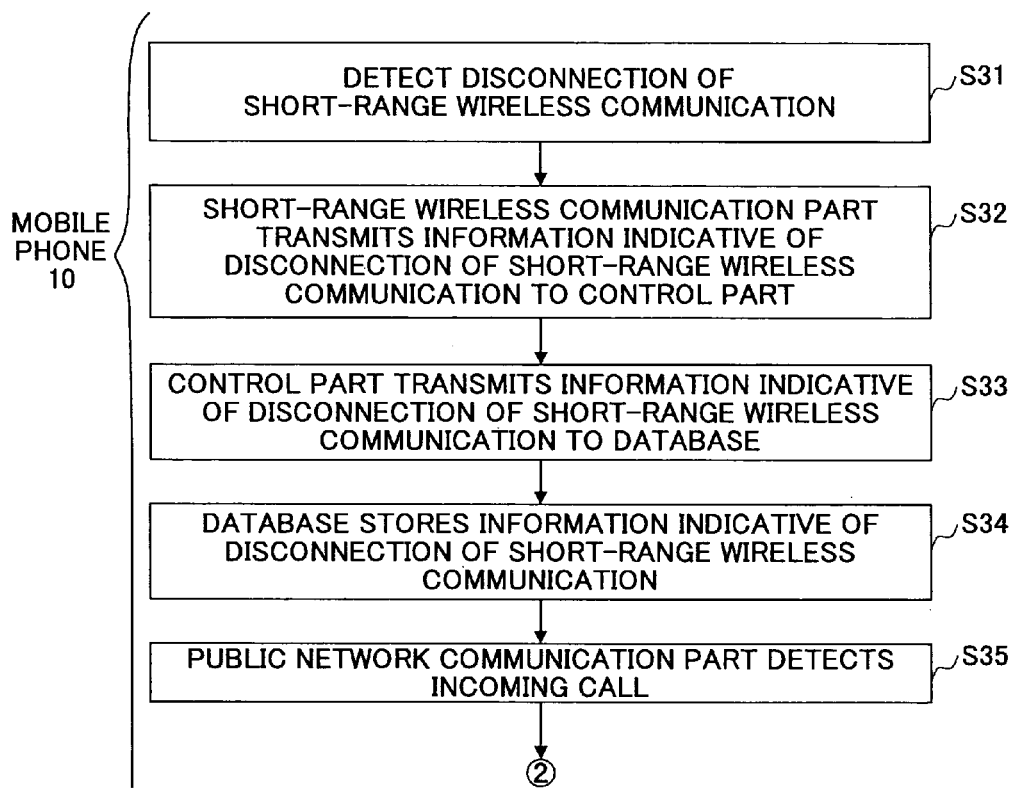
Figure 5:
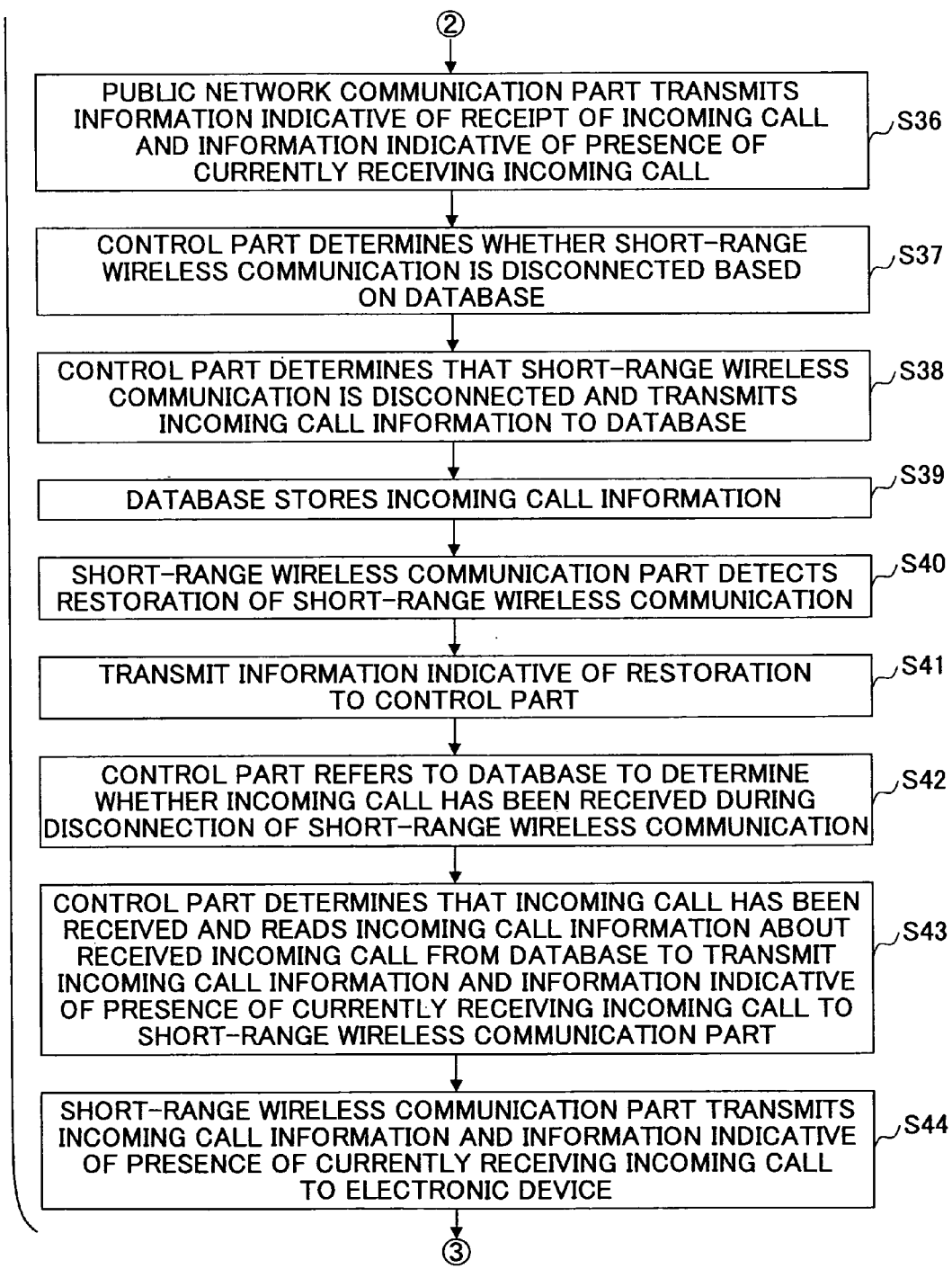

Next, with reference to FIGS. 4-6, operations of the mobile phone 10 are described according to the second embodiment of the present invention.

It is to be noted that the operations of the first embodiment described above with reference to FIGS. 2 and 3 and the operations of the second embodiment described below can be selectively performed in the mobile phone 10 in any suitable manner as desired by the user. For example, the operations of the second embodiment may be performed if an incoming call that reached the mobile phone 10 during disconnection of the short-range wireless communication is still being received at the time of restoration of the short-range wireless communication. Also, by way of example, the operations of the first embodiment may be performed if an incoming call that reached the mobile phone 10 during disconnection of the short-range wireless communication is ended before restoration of the short-range wireless communication.

Alternatively, only either of the operations of the first embodiment or the operations of the second embodiment may be performed.

Referring to FIG. 4, if the short-range wireless communication part 12 detects disconnection of short-range wireless communication with the wristwatch type electronic device 20 (Step S31), the short-range wireless communication part 12 transmits information indicative of the disconnection to the control part 13 (Step S32). The control part 13 receives the information and transmits the received information to the database 14 (Step S33). The database 14 receives the information and stores the received information indicative of the disconnection of the short-range wireless communication (Step S34).

If there is an incoming call to the mobile phone 10 from the outside, the public network communication part 11 detects the incoming call (Step S35). The public network communication part 11 then transmits information indicative of receipt of the incoming call to the control part 13 (Step S36). While the incoming call is being received, the public network communication part 11 continues transmitting to the control part 13 information indicative of the presence of the currently receiving incoming call. The control part 13 receives the information and refers to the database 14 to determine whether the short-range wireless communication is disconnected (Step S37).

If the control part 13 determines that the short-range wireless communication is disconnected based on the information stored in the database 14, the control part 13 receives incoming call information from the public network communication part 11 and transmits the incoming call information to the database 14 (Step S38). The database 14 stores the received incoming call information (Step S39).

When the short-range wireless communication is restored, the short-range wireless communication part 12 detects the restoration (Step S40). The short-range wireless communication part 12 then transmits information indicative of the restoration to the control part 13 (Step S41). The control part 13 receives the information and refers to the database 14 to determine whether an incoming call has been received during the disconnection of the short-range wireless communication (Step S42).

If the control part 13 determines that an incoming call has been received during the disconnection of the short-range wireless communication based on the information stored in the database 14, the control part 13 reads incoming call information about the incoming call from the database 14 and transmits the read incoming call information to the short-range wireless communication part 12 (Step S43). If information indicative of a presence of a currently receiving incoming call is received from the public network communication part 11, the control part 13 transmits the received information indicative of the presence of the currently receiving incoming call together with the incoming call information. The short-range wireless communication part 12 transmits the received incoming call information and the information indicative of the presence of the currently receiving incoming call to the wristwatch type electronic device 20 using the short-range wireless communication (Step S44).

When the wristwatch type electronic device 20 receives the incoming call information and the information indicative of the presence of the currently receiving incoming call, the short-range wireless communication part 21 of the wristwatch type electronic device 20 transmits the incoming call information and the information indicative of the presence of the currently receiving incoming call to the control part 22 (Step S45). When receiving the incoming call information and the information indicative of a presence of the currently receiving incoming call, the control part 22 controls the display part 23 and the ringing part 24 (Step S46) so as to cause the display part 23 to display the incoming call information and the information indicative-of the presence of the currently receiving incoming call on its screen (Step S47). The control part 22 may also cause the ringing part 24 to sound ringtones or vibrate the wristwatch type electronic device 20, thereby notifying a user of the receipt of the incoming call information and the information indicative of the presence of the currently receiving incoming call (Step S48).

Thus, the user can obtain the incoming call information about the incoming call received during the disconnection of the short-range wireless communication and the information indicative of the presence of the currently receiving incoming call without actually picking up the mobile phone 10. Then, the user can take any appropriate action, such as actually picking up the mobile phone 10 to answer the incoming call, depending on the obtained information.

The following describes a method of connecting the mobile phone 10 of the above-described embodiments of the present invention to other electronic devices such as the above-described wristwatch type electronic device 20 using short-range wireless communication.

It is to be noted that the mobile phone 10 is connectable, with use of the function of the short-range wireless communication part 12, to destination electronic devices 1, 2, 3, . . . , and N such as the wristwatch type electronic device 20, by means of radio signals (e.g. electromagnetic radio wave based on the Bluetooth standards, transmission media based on other communication standards) transmitted and received via the antenna 17.

A method of registering a destination device of short-range wireless communication is as follows.

For example, in the case of registering short-range wireless communication destination electronic devices 1, 2, and 3 in the mobile phone 10, a user performs an electronic device registration operation using a user interface (hereinafter simply referred to as an UI) 15 of the mobile phone 10. Based on the registration operation, the control part 13 causes the short-range wireless communication part 12 to output radio signals to detect electronic devices 1, 2, 3, . . . , and N present in the vicinity.

The presence of the electronic devices 1, 2, 3, . . . , and N are confirmed by receiving response signals from the electronic devices 1, 2, 3, . . . , and N. If the electronic devices 1, 2, and 3 are detected as the destination electronic devices, the short-range wireless communication part 12 transmits to the control part 13 device addresses of the electronic devices 1, 2, and 3 for short-range wireless communication. The control part 13 displays the received device addresses of the electronic devices 1, 2, and 3 on the UI 15. The user enters a device registration instruction based on the displayed addresses, so that the corresponding short-range wireless communication destination devices are registered in a device registration part of the database 14.

A method of connecting to short-range wireless communication destination devices is as follows.

In the case of automatically establishing connection, the control part 13 reads device addresses registered in the device registration part of the database 14 and causes the short-range wireless communication part 12 to automatically and regularly call the electronic devices 1-N corresponding to the device addresses. If any of the electronic devices 1-N respond to the call, the short-range wireless communication part 12 is connected to the electronic devices 1-N that have responded to the call.

In the case of manually establishing connection, a user enters an instruction for manual connection using the UI 15 of the mobile phone 10. The instruction is transmitted from the UI 15 to the control part 13. The control part 13 receives the instruction and reads addresses of devices registered in advance in the database 14 so as to display the registered devices on the UI 15. The user selects a desired device from the registered devices using the UI 15. According to the selection, the control part 13 causes the short-range wireless communication part 12 to automatically call the selected device using the short-range wireless communication. If the selected device responds to the call, the short-range wireless communication part 12 is connected to the device.

A method of disconnecting from short-range wireless communication destination devices is as follows.

In the case of automatically disconnecting from destination devices (this operation is hereinafter referred to as "automatic disconnection"), if the level of signals received by the short-range wireless communication part 12 of the mobile phone 10 via the antenna is too low to provide communication, the short-range wireless communication part 12 automatically disconnects the communication.

In the case of manually disconnecting from destination devices (this disconnection operation is performed by users and hereinafter referred to as "manual disconnection"), a user enters an instruction for manual disconnection using the UI 15 of the mobile phone 10. In response, the control part 13 refers to the database 14 so as to retrieve addresses of connected devices. The control part 13 then displays the addresses of the connected devices on the UI 15. The user selects the address of the device to be disconnected from the displayed addresses. According to the selection, the control part 13 causes the short-range wireless communication part 12 to disconnect short-range wireless communication with the device of the selected address.

The following describes examples of effective use of the functions of the mobile phone 10 of the above-described embodiments of the present invention.

In the following examples, the mobile phone 10 is configured in advance to display, when there is an incoming telephone call, information indicative of receipt of the call and information of the caller, such as the telephone number of the caller and the name of the caller (if registered in a telephone book), on the wristwatch type electronic device 20 worn by a user using short-range wireless communication.

In the first example, the user is in an office with the mobile phone 10 in his brief case. When the user moves from the brief case with the mobile phone 10 in it to a location far enough to disable short-range wireless communication between the mobile phone 10 and the wristwatch type electronic device 20, the short-range wireless communication is disconnected. Therefore, if there is an incoming telephone call to the mobile phone 10 while the user is away from the brief case, the user cannot know the incoming call.

When the user moves back to a location near the brief case within the area where the short-range wireless communication between the mobile phone 10 and the wristwatch type electronic device 20 worn by the user is available, the short-range wireless communication is restored. Then, the mobile phone 10 with the functions described in the above embodiments of the present invention transmits to the wristwatch type electronic device 20 information indicative of receipt of the incoming call and information about the caller such as the telephone number of the caller and the name of the caller, so that the wristwatch type electronic device 20 displays the transmitted information. Thus the user can surely have the information indicative of the receipt of the incoming call and the incoming call information.

In the second example, when the user is in the office with the mobile phone 20 in his brief case, short-range wireless communication between the mobile phone 10 and the wristwatch type electronic device 20 is temporarily disconnected for some reason. If there is an incoming call to the mobile phone 10 during the disconnection, the mobile phone 10 transmits, upon restoration of the short-range wireless communication, information indicative of the presence of the currently receiving incoming call and incoming call information such as the telephone number of the caller and the name of the caller using short-range wireless communication. Then, the wristwatch type electronic device 20 performs a ringing operation indicative of the presence of the currently receiving incoming call and displays the incoming call information. Thus the user can surely know the presence of the currently receiving incoming call and have the incoming call information.

In the third example, the mobile phone 10 is connected to a personal computer in place of the wristwatch type electronic device 20 using short-range wireless communication. When the user is in the office with the mobile phone 20 in his brief case, the short-range wireless communication between the mobile phone 10 and the personal computer is temporarily disconnected for some reason. If there is an incoming call to the mobile phone 10 during the disconnection, the mobile phone 10 transmits, upon restoration of the short-range wireless communication, information indicative of the presence of the currently receiving incoming call and incoming call information such as the telephone number of the caller and the name of the caller using short-range wireless communication. Then, the personal computer performs a ringing operation indicative of the presence of the currently receiving incoming call and displays the incoming call information. Thus the user can surely know the presence of the currently receiving incoming call and have the incoming call information.

In the fourth example, while the user is walking with the mobile phone 10 in his brief case, short-range wireless communication between the mobile phone 10 and the wristwatch type electronic device 20 is temporarily disconnected for some reason. If there is an incoming call to the mobile phone 10 in such a situation, the mobile phone 10 transmits, upon restoration of the short-range wireless communication, information indicative of the presence of the currently receiving incoming call and incoming call information such as the telephone number of the caller and the name of the caller using short-range wireless communication. Then, the wristwatch type electronic device 20 performs a ringing operation indicative of the presence of the currently receiving incoming call and displays the incoming call information. Thus the user can surely know the presence of the currently receiving incoming call and have the incoming call information.

According to the above-described embodiments of the present invention, even if short-range wireless communication between the mobile phone 10 and an electronic device such as the wristwatch type electronic device 20 or the personal computer is disconnected for some reason (by the above-described automatic disconnection or manual disconnection), information about incoming calls received by the mobile phone 10 during the disconnection is held in the mobile phone 10. Then, when the disconnected short-range wireless communication is restored, the information held in the mobile phone 10 is automatically transmitted to the electronic device. Accordingly, a user can obtain the information about incoming calls received during the disconnection of the short-range wireless communication. Thus the user can surely and timely know the information about the incoming calls to the mobile phone 10 without paying any attention to conditions where short-range wireless communication is disconnected for some reason.

The present application is based on Japanese Priority Application No. 2006-088853 filed on Mar. 28, 2006, with the Japanese Patent Office, the entire contents of which are hereby incorporated by reference.

What is claimed is:

1. An information terminal device, comprising:
a short-range wireless communication unit that performs communication with an electronic device via short-range wireless communication;
a public communication unit that performs communication via a public communication network;
a storing unit configured to store information concerning communication via the public communication network; and
a control unit that
determines, in response to an incoming communication via the public communication network, whether the short-range wireless communication with the electronic device is in disconnection,
stores incoming communication information concerning the incoming communication via the public communication network received after the disconnection of the short-range wireless communication into the storing unit if the short-range wireless communication with the electronic device is in disconnection, and
causes, upon restoration of the short-range wireless communication with the electronic device, the short-range wireless communication unit to transmit to the electronic device the incoming communication information and information indicative of ongoing communication if the incoming communication information is stored in the storing unit and the communication via the public communication network is ongoing.

2. The information terminal device as claimed in claim 1, wherein the information terminal device includes a mobile phone,
the communication via the public communication network is telephone communication via the public communication network, and
the incoming communication information concerning the incoming communication via the public communication network is incoming telephone call information.

3. The information terminal device as claimed in claim 1, wherein if the communication via the public communication network is ongoing upon the restoration of the short-range wireless communication with the electronic device, the control unit causes the short-range wireless communication unit to transmit to the electronic device the information indicative of the ongoing communication and the incoming communication information concerning the incoming communication via the public communication network stored in the storing unit, to display at the electronic device to respond to the ongoing communication.

4. The information terminal device as claimed in claim 3, wherein the information terminal device includes a mobile phone,
the communication via the public communication network is telephone communication via the public communication network, and the incoming communication information concerning the incoming communication via the public communication network includes a telephone number of a caller and time of receiving an incoming telephone call.

5. The information terminal device as claimed in claim 4, wherein the control unit stores the incoming communication information each time the incoming communication is received via the public communication network during the disconnection with the electronic device, and the short-range wireless communication unit transmits to the electronic device one or more sets of the incoming communication information and the information indicative of the ongoing communication, so that the electronic device displays, at a display part, the one or more sets of the incoming communication information and the information indicative of the ongoing communication.

6. The information terminal device as claimed in claim 1, wherein the electronic device is wearable by a user.

7. The information terminal device as claimed in claim 1, wherein the electronic device includes a personal computer.

8. A method of controlling an information terminal device comprising:

performing, by a short-range wireless communication unit, communication with an electronic device via a short-range wireless communication;

performing, by a public communication unit, communication via a public communication network;

storing information concerning communication via the public communication network;

determining, by a control unit, in response to an incoming communication via the public communication network, whether the short-range wireless communication with the electronic device is in disconnection;

storing, by the control unit, incoming communication information concerning the incoming communication via the public communication network received after the disconnection of the short-range wireless communication, to a storing unit, if the short-range wireless communication with the electronic device is in disconnection; and transmitting, by the control unit, upon restoration of the short-range wireless communication with the electronic device, to the electronic device using the short-range wireless communication the incoming communication information and information indicative of ongoing communication if the incoming communication information is stored in the storing unit and the communication via the public communication network is ongoing.

9. The method of controlling an information terminal device as claimed in claim 8, wherein the information terminal device includes a mobile phone, the communication via the public communication network is telephone communication via the public communication network, and the incoming communication information concerning the incoming communication via the public communication network is incoming telephone call information.

10. The method of controlling an information terminal device as claimed in claim 8, wherein if the communication via the public communication network is ongoing upon the restoration of the short-range wireless communication with the electronic device, the information indicative of the ongoing communication and the incoming communication information concerning the incoming communication via the public communication network stored in the storing are transmitted to the electronic device using the short-range wireless communication, to display at the electronic device to respond to the ongoing communication.

11. The method of controlling an information terminal device as claimed in claim 10, wherein the information terminal device includes a mobile phone, the communication via the public communication network is telephone communication via the public communication network, and the incoming communication information concerning the incoming communication via the public communication network includes a telephone number of a caller and time of receiving an incoming telephone call.

12. The method of controlling an information terminal device as claimed in claim 8, wherein the electronic device is wearable by a user.

13. The method of controlling an information terminal device as claimed in claim 8, wherein the electronic device includes a personal computer.

14. A non-transitory computer-readable medium storing a computer-readable program for controlling an information terminal device that has a function for performing communication with an electronic device via short-range wireless communication and a function for performing communication via a public communication network, the program comprising a set of instructions for causing a computer to execute:

storing information concerning communication via the public communication network;

determining, by the computer, in response to an incoming communication via the public communication network, whether the short-range wireless communication with the electronic device is in disconnection;

storing, by the computer, incoming communication information concerning the incoming communication via the public communication network received after the disconnection of the short-range wireless communication, to a storing unit, if the short-range wireless communication with the electronic device is in disconnection; and transmitting, by the computer, upon restoration of the short-range wireless communication with the electronic device, to the electronic device using the short-range wireless communication the incoming communication information and information indicative of ongoing communication if the incoming communication information is stored in the storing unit and the communication via the public communication network is ongoing.

15. The non-transitory computer-readable medium as claimed in claim 14, wherein the information terminal device includes a mobile phone, the communication via the public communication network is telephone communication via the public communication network, and the incoming communication information concerning the incoming communication via the public communication network is incoming telephone call information.

16. The non-transitory computer-readable medium as claimed in claim 14, wherein if the communication via the public communication network is ongoing upon the restoration of the short-range wireless communication with the electronic device, the information indicative of the ongoing communication and the incoming communication information concerning the incoming communication via the public communication network stored in the storing are transmitted to the electronic device using the short-range wireless communication, to display at the electronic device to respond to the ongoing communication.

17. The non-transitory computer-readable medium as claimed in claim 16,
    wherein the information terminal device includes a mobile phone,
    the communication via the public communication network is telephone communication via the public communication network, and
    the incoming communication information concerning the incoming communication via the public communication network includes a telephone number of a caller and time of receiving an incoming telephone call.

* * * * *